United States Patent [19]

McCullough et al.

[11] 3,979,578

[45] Sept. 7, 1976

[54] ACCESS CONTROLLER AND SYSTEM

[76] Inventors: Ira J. McCullough, 5820 S. Alameda St., Los Angeles, Calif. 90024; Albert J. Lee, 7419 Ruffner St., Van Nuys, Calif. 91406; John G. Sullivan, 1034 - 17th St. Apt. 102, Santa Monica, Calif. 90403

[22] Filed: June 23, 1975

[21] Appl. No.: 589,244

[52] U.S. Cl. .................. 235/61.11 E; 235/61.11 D
[51] Int. Cl.² ..................... G06K 7/04; G06K 19/06
[58] Field of Search ............. 235/61.11 E, 61.11 D, 235/61.7 B; 340/149 A; 360/137

[56] References Cited
UNITED STATES PATENTS

| | | | |
|---|---|---|---|
| 3,671,720 | 6/1972 | White et al. | 235/61.7 B |
| 3,688,088 | 8/1972 | Brown et al. | 235/61.7 B |
| 3,701,100 | 10/1972 | Yarbrough | 235/61.7 B |
| 3,743,134 | 7/1973 | Constable et al. | 235/61.11 D |
| 3,800,328 | 3/1974 | Harlan et al. | 360/137 |

*Primary Examiner*—Vincent P. Canney
*Attorney, Agent, or Firm*—Whann & McManigal

[57] ABSTRACT

An access controller and system in which an opening for the reception of an access identification member, such as a ticket, card, and the like, is provided with an entrance guard to prevent the insertion of foreign objects, such as coins, metal pieces, and the like, which could jam the device and render the device and system inoperative. Control means including sensing means at the approach side of the guard controls motivation of the guard means to an open position with respect to the opening in accordance with a key-coded portion on the identification member, whereby the identification member will be preselected at a first predetermined position prior to its being permitted to move into the receiving opening and into a second position on the rear side of the guard means for effecting control of one or more predetermined use functions according to the particular system in which the device is employed, such as the deposit of the identification member; the operation of a remote access mechanism such as a turnstile, gate, and the like; the recording of information contained in another key-coded portion of the identification member; and the monitoring of the received identification members, and the like.

12 Claims, 5 Drawing Figures

U.S. Patent  Sept. 7, 1976  3,979,578
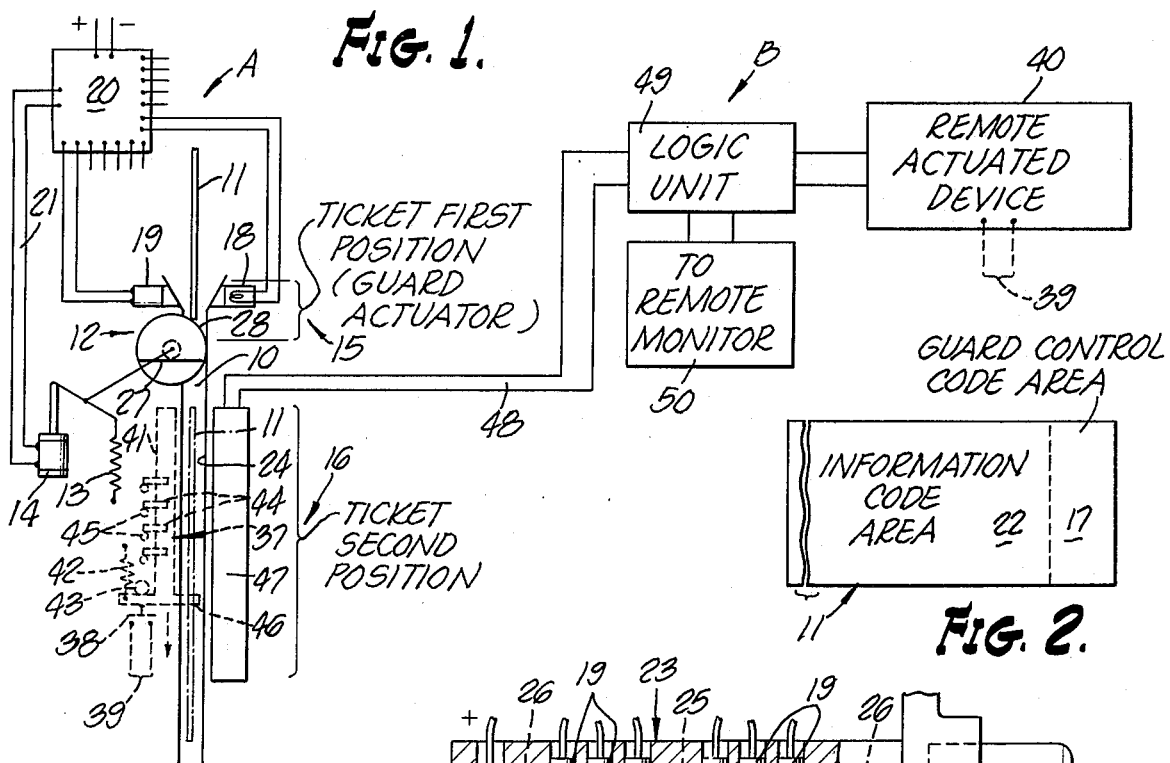
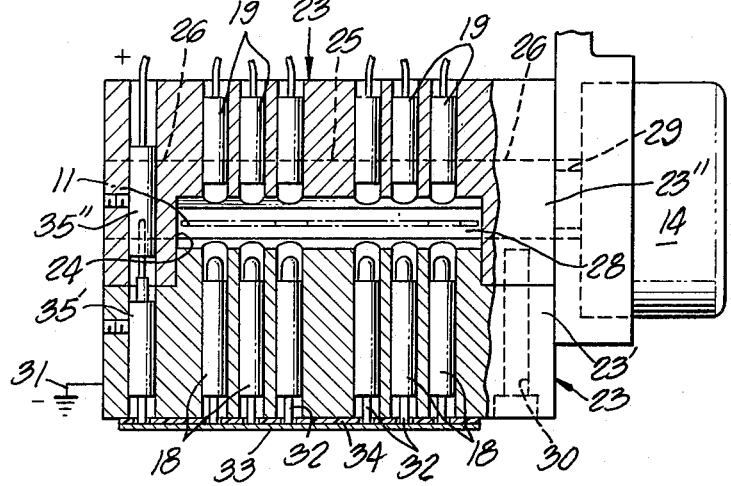
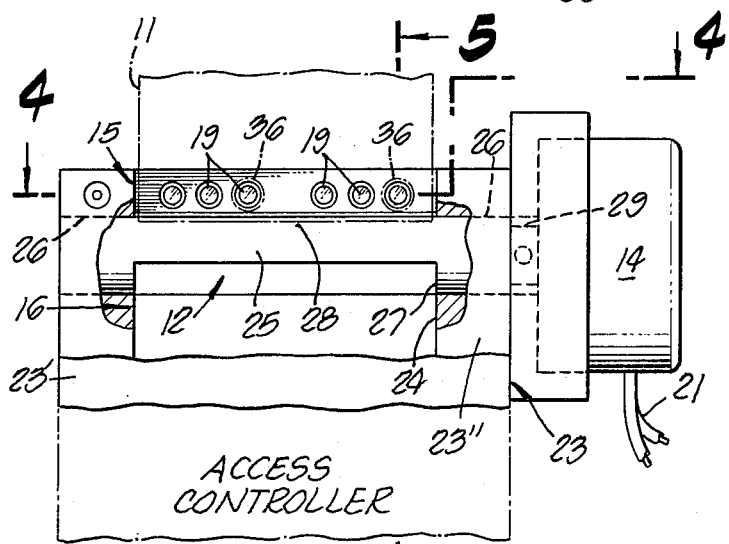
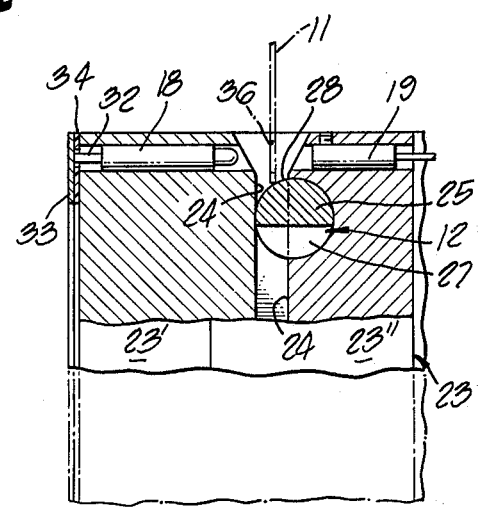

ACCESS CONTROLLER AND SYSTEM

BACKGROUND OF THE INVENTION

The present invention relates generally to the field of access controllers and systems.

Heretofore, it has been generally known to provide key-coded members in the form of tickets, cards, and the like, which were adapted to be inserted into a opening of a control device for the purpose of gaining admittance to an area such as a parking facility or a building which would otherwise be prohibited to persons who did not have the proper key-coded ticket or card.

In the known devices and systems, a number of different means and methods have been utilized for producing the key-coded means. A few such arrangements may be enumerated as follows:

a. In one arrangement, the ticket or card has been punched or perforated in areas to operate in conjunction with associated sensing and decoding arrangements utilizing light beams, etc.

b. Shim Type Card: This card is used primarily for static decoding and usually comprises a laminated structure containing a predetermined arrangement of flat metallic shims to provide the desired coding these shim being arranged to operate locking elements such as magnets, and upon being released permitting movement of the card and an associated slide member to a position in which a normally "off" switch will be motivated to an "on" position to close a use circuit.

c. Barium Ferrite Type Card: This card is also usually of the laminated type and contains a concealed layer of barium ferrite, which is adapted to be magnetically coded for operation, for example, with associated magnetic switches for controlling a use circuit.

d. Mag-Strip Type Card: This card is usually constructed with an oxide strip extending longitudinally of a card surface, and can be variously coded to provide for dynamic movement readout to provide information for storage or other purpose, and in the control of the actuation of remote access devices such as doors, turnstiles, and the like.

All of the presently known devices and systems have been found to contain an undesirable inherent disadvantage or drawback which limits their wide application in the field of access control devices and systems. Primarily, these known devices and systems have no means for preventing the insertion of various objects such as coins, metal pieces, improper cards and the like, into the decoding section of the device, and which foreign objects could operate to jamb the device and render it inoperable. With the foregoing in mind, the present invention overcomes and solves the inherent disadvantages of the known devices as stated above by the provision of guard means which are susceptible of utilization generally with a variety of access control devices and systems:

1. To prevent the introduction of foreign matter into the device, which could produce malfunctions.
2. To provide for the initial key-coded preselection of a card, ticket, or the like, identifying member prior to permitting its passage to a following section for deposit, further decoding or other purposes.
3. To provide a positive protective guard means which is adapted for use with ticket access systems, and wherein such systems are utilized for monitoring, storage, and the like, of information contained on the ticket, card, or other identifying member.

SUMMARY OF THE INVENTION

The present invention relates generally to access controllers and systems, and is more particularly concerned with the protection thereof against malfunction.

It is one object of the herein described invention to provide unique guard means having wide applications of use for key-coded ticket or card receiving openings of access controllers and systems, which will prevent the insertion of foreign objects into the receiving openings and which might impair the operation and cause malfunctions either of the controllers or the systems in which the controllers are embodied.

A further object is to provide in an access controller, guard means having a normally closed position preventing reception of a key-coded ticket or card into a receiving opening or slot unless the ticket or card carries the correct predetermined code to energize and actuate the guard means to an open position.

Another object is to provide normally closed guard means for a ticket or card receiving opening, in which the control for opening the guard means functions in response to key-coding means carried by the ticket or card, and which serves to preselect as between tickets and cards which should or should not be received by the opening.

It is still another object to provide in an access system, a ticket or card receiving structure in which guard means in the receiving path of the movement of the ticket or card provides a first position on the approach side of the guard means wherein sensing means will operate to open the guard means in response to a key-coded portion at the leading end of the ticket or card, and permit movement of the ticket or card past the guard means to a second position wherein decoding means of the system will be responsive to another key-coded portion of the ticket or card.

It is also an object to provide a system according to the preceding object, wherein the decoding means of the second position has its output connected with a logic unit for effecting a plurality of system operations such as the actuation of an access signal or other device, monitors, computers, and the like.

Further objects of the invention will be brought out in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only:

FIG. 1 is a view diagrammatically illustrating an access controller and schematically illustrating its embodiment into an access control system, according to the present invention;

FIG. 2 is a fragmentary view of a key-coded ticket or card as utilized therein;

FIG. 3 is an enlarged fragmentary elevational view of the ticket or card receiving portion of an access controller embodying the features of the present invention, portions being cut away to disclose the operative relationship of internal portions thereof;

FIG. 4 is a transverse sectional view taken substantially on line 4—4 of FIG. 3; and FIG. 5 is a fragmentary vertical section taken substantially on line 5—5 of FIG. 3.

DESCRIPTION OF A PREFERRED EMBODIMENT

Referring now specifically to the drawings, for illustrative purposes, the access controller and associated system according to the present invention are disclosed in FIG. 1 as comprising an access controller as generally indicated at A, together with electrically coupled components of the system as generally indicated at B.

The access controller may vary as to the details of its physical structure, but irrespective of the physical arrangement will basically include an opening or slot 10 for the reception of an identification member 11 which may be key-coded according to any one of the conventionally known key-coding methods. The opening 10 is arranged to be normally closed by guard means, as normally indicated by the numeral 12, which operates to prevent the insertion of foreign matter such as paper, metal objects and other articles into the opening 10, and which could cause malfunction of the device or system. Normally, the guard means are urged to a closed position by a spring 13, and to an open position by means of a solenoid 14, these elements being embodied in the actuating means for the guard means.

The guard means 12, in its closed position, also forms an abutment or stop in the approach path of movement of the identification member 11 to the opening 10 and confines the approach movement of the leading end of the identification member to a first position 15 on the approach side of the guard means 12, which has been noted on the drawing as the "TICKET FIRST POSITION". The guard means 12 thus prevents movement of the identification member 11 beyond the guard means 12 into a second position, as generally indicated by the numeral 16 and noted on the drawing as the "TICKET SECOND POSITION".

In order to preselect the identification members, and open the guard means 12 to permit passage of the identification member to the second position 16, provision is made in the first position for opening the guard means in response to key-coded information contained in a first portion 17 at the leading end of the identification member, as indicated in FIG. 2.

Various types of known sensing means may be utilized for sensing the key-coded portion 17, and for purposes of illustrating one such sensing means, there is shown light source means 18 which are positioned on one side of the approach path of the identification member 11 to the guard means 12, and pick-up means 19 positioned on the opposite side of said approach path to respond to variations in a characteristic of the light beam traversing said approach path by the key-coded portion 17 of the identification member 11. The light source means and pick-up means are connected with a control unit, as generally indicated at 20, which is operative upon the approach of a properly coded identification member to energize the solenoid 14 through a control circuit 21 to motivate the guard means to open position and permit passage of the identification member 11 to the second position 16, wherein key-coded information contained in a second portion 22 of the identification member 11, as shown in FIG. 2, may be utilized for the control of further system operations and functions of the particular system with which the access controller A may be associated.

More specifically, as shown in FIGS. 3–5, the access controller is shown as comprising a housing structure, as generally indicated by the numeral 23, which is adapted to be incorporated in or associated with a stanchion or other means to provide an identification member receiving station. The housing structure 23 is preferably formed with a head portion 23' which is arranged to house the guard means 12 and sensing means, in this case the light source means 18 and the pick-up means 19. As shown, the housing structure 23 is formed internally to provide a guiding passageway 24 for guiding the movement of an inserted identification member 11 which is to be processed. As shown, this passageway extends above the guard means to form the first position 15 for the identification member 11, and below the guard means 12 to form the second position 16 of the identification member. In its illustrated form, the guard means comprises a circular shaft 25 having its opposite ends 26 rotatably supported in the adjacent wall structures of the housing 23. Intermediate these ends, and in the area of the passageway 24, the shaft 25 is cut out or longitudinally notched, as indicated at 27. The axis of rotation of the shaft 25 is such that, in the closed position of the guard means, a curved abutment surface 28 of the shaft will extend across the passageway 24, and in the open position the cut out will assume an orientation with respect to the passageway so as not to impede the passage of the identification member 11. One end of the circular shaft 25 is operatively connected with a driving shaft 29 of a rotatable solenoid 14 of conventional construction, and which is normally spring urged to one position of rotation and movable to another position of rotation upon being energized. In its deenergized condition, the solenoid is spring urged to a closed position of the guide means 12.

For convenience, the head portion of the housing structure 23 may be transversely divided into separable sections 23' and 23'' which are secured together by appropriate cap screws 30, or other suitable means. In practice, as shown in FIGS. 4 and 5, the light means comprises a plurality of individual light sources 18 which are supported within the head section 23' and the pick-up means comprises a plurality of pick-up means 19 which are supported in the head section 23'' for respective operative association with the individual light sources, as shown. While each light means 18 and each pick-up means 19 are shown in FIG. 1 as having connection with the control unit 20 by two conductors, as a practical matter only one conductor is necessary in each case as the other part of the circuit may be provided by a common ground connection as indicated at 31. Also, a common conductor may be utilized to feed one terminal of the respective light means 18, and for this purpose each light means has a terminal 32 which is connected to a common conducting strip 33 which is supported in insulated relation to the frame structure by means of an insulating strip 34. If desired, circuit connection to the strip 33 may be accomplished through mating connector components 35' and 35'' respectively carried by the head sections 23' and 23'', as shown in FIG. 4.

For illustrative purposes, the identifying keycoding means at the leading end of the identification member 11 is illustrated as comprising punched openings 36 which will permit light rays to pass through the identification member in the case of the light rays means being aligned with these openings, whereas in the portions of the identification member which do not have these openings, the passage of the light rays from the respective light means 18 will be prevented. By utilizing different combinations of openings, different key-coded combinations may be provided for a preselection of the identification members, and the operation of the gate means 12. It will be appreciated, of course, that different types of sensing means may be utilized, depending upon the key-coding method utilized, and it is not the intention in this application to limit the invention to the particular type of sensing means which have been shown and described.

As previously stated, the key-coded information as contained in the second portion 22 of the identification member is primarily for use when the identification member reaches the second position 16, and in the event that the identification member is not to be merely deposited after it passes the guard means 12.

In one arrangement of the invention, wherein the identification member is to be inserted into the access controller and then removed, the coded identification member may be utilized to manually energize a control circuit for the activation of an access device 40 such as a turnstile, gate, and the like. For such purpose, a known commercially available device, as generally indicated by the numeral 37, may be utilized to close the normally open contacts of switch means 38 of a connected control circuit 39 connected with the remotely actuated access device 40.

The device 37 may vary as to construction, but has been diagrammatically illustrated in one available form as comprising a slide mounted member 41 which is biased by a spring 42 in one direction against a stop 43. Means are provided for normally locking the slide member 41 in the position of engagement with the stop 43. In this instance, the locking means comprises a plurality of small magnetized pins 44 which are normally urged by a spring or otherwise to a locking position with respect to an associated fixed pin 45 in a manner to oppose movement of the slide member 41 away from the stop 43. The magnetized pins 44 and associated stops 45 are susceptible of a predetermined spacing orientation in accordance with a desired coding as may be contained in the second portion 22 of the identification member 11. Such coding may be of the shim type in which small metal pieces are arranged according to the desired code, and when the identification member is moved into the second position 16 into abutment with a projection ledge 46 of the slide member 41, these shims will act to move the magnetized pins to a nonlocking position with respect to the fixed stops 45. With the slide member 41 lockingly released, the identification member 11 may be manually pushed against the projecting ledge 46 in a direction to move the slide member 41 away from the stop 43 to a position which closes the contacts of switch means 38. Thus, in this case, the device 37 is utilized as an "off" and "on" controller for the actuation of the access device 40.

Another system arrangement may utilize appropriate decoder means, as generally indicated by the numeral 47, instead of a device 37. The decoder means 47 is of conventional construction and may be of the static or dynamic type, depending upon the method of key-coding utilized in the second portion 22 of the identification member 11.

As illustrated, the decoding means 47 is coupled by an output circuit 48 to a logic unit, as generally indicated by the numeral 49, wherein the decoded information will be processed and fed to associated use circuits such as a remote monitor 50, the remote actuated device 40 and the like.

From the foregoing description and drawings, it will be clearly evident that the delineated objects and features of the invention will be accomplished.

Various modifications may suggest themselves to those skilled in the art without departing from the spirit of our invention, and, hence, we do not wish to be restricted to the specific forms shown or uses mentioned, except to the extent indicated in the appended claims.

We claim:

1. In a controller having an opening for receiving a key-coded identification member such as a ticket, card, and the like, means for guarding said opening against the reception of foreign objects which might jam the opening and prevent reception of an identification member, the improvement comprising:
   a. guard means in an approach path of movement, of the identification member, passing through said opening, said guard means being rotatably supported for movement to opened and closed positions with respect to said opening, and being normally motivated towards said closed position, said guard means in said closed position presenting an abutment surface such that pressure forces applied thereagainst by an inserted identification number tends to force the guard means in a closing direction; and
   b. actuator means operable to move said guard means from a closed position to an opened position in response to sensing means activated by the presence of a properly key-coded portion of said identifying member in said approach path ahead of said guard means.

2. A controller as set forth in claim 1, wherein the guard means comprises an elongate member having a longitudinal axis of rotation, and in which the presented surface is a longitudinally extending curved surface movable in response to said rotation into and out of said closed position.

3. A controller as set forth in claim 2, wherein said longitudinally extending surface is movable in one direction of rotation of the elongate member into a position across said opening, and in a reversed direction of rotation to a position removed from said opening.

4. A controller as set forth in claim 3, wherein the elongate member is transversely of circular configuration, and said surface is formed by a longitudinally extending cut out portion lying on one side of a transverse diameter.

5. A controller as set forth in claim 4, in which said actuator means includes a spring for normally urging said guard means towards said closed position, and a solenoid energizably controlled by said sensing means to move said guard means from said closed position to said opened position and align said cut out portion with said opening.

6. A controller as set forth in claim 1, in which said sensing means comprises a source of radiated rays positioned on one side of said approach path and radiated rays sensitive pick-up means on an opposite side of said approach path, whereby said radiated rays will traverse the approach path of movement of said identification member.

7. A controller as set forth in claim 6, wherein said radiation comprises light rays.

8. A controller as set forth in claim 6, wherein there are a plurality of radiated rays, and a pick-up means for each of said rays, and in which the rays are light rays.

9. A controller as set forth in claim 8, wherein the activation of the respective pick-up means by their associated light rays are selectively controlled according to a predetermined code in response to a prearranged plurality of means at a leading end portion of the identification member traversing said approach path, each of said leading end means being capable of varying a characteristic of said rays.

10. In an access control system, a controller arranged to receive a key-coded identifying member such as a ticket, card, and the like, the improvement comprising:
   a. said controller having a passageway with an entrance slot opening for the reception of said identifying member, said identifying member having a predetermined key-coded first portion and a second key-coded portion;
   b. guard means in said passageway separating said passageway into a first entrance section on one side of the guard means having direct communication with said slot opening, and a second following section on the opposite side of said guard means, said guard means being movable to a passage closed position limiting the reception of the identifying member to the first section only, and to a passage opened position permitting further entry of the member into the second section;
   c. means operable to move said guard means from a normal passage closed position to said passage opened position in response to the reception of said first portion of said identifying member into said first section, whereby only identifying members as preselected in said first section are permitted to enter said second section; and
   d. means in said second section activated by said second key-coded portion and being operable to produce output signal means in a connected use circuit, comprising:
      a slide member supported for limited linear movement between a first position and a second position;
      means normally urging said slide member to said first position;
      means releasably locking said slide member in said first position and upon being released enabling movement thereof to said second position;
      said slide member having an abutment positioned in said second section for engagement by said identifying member and operative in response to forces applied to advance the position of the identifying member in said second section to move the lockingly released slide member to said second position, said locking means including locking elements selectively operable to lockingly released position as determined by said second key-coded portion; and
      switching means in said use circuit actuated by movement of said slide member to said second position.

11. Access control according to claim 10, wherein said use circuit is operatively connected to control a remotely actuated device.

12. Access control according to claim 10, in which said means in said second section comprises means for decoding key-coded information contained in said second key-coded portion of said identifying member.

* * * * *